United States Patent
Trimble

[15] 3,648,261
[45] Mar. 7, 1972

[54] MAGNETIC ROD READ ONLY MEMORY

[72] Inventor: Cebern B. Trimble, Dayton, Ohio
[73] Assignee: The National Cash Register Company, Dayton, Ohio
[22] Filed: May 18, 1970
[21] Appl. No.: 38,458

[52] U.S. Cl............340/174 SP, 340/174 PW, 340/174 VC, 340/174 DA, 340/174 RC
[51] Int. Cl.............................G11c 17/00, G11c 11/04
[58] Field of Search ...............340/174 PW, 174 SP, 174 VC, 340/174 DA, 174 RC

[56] References Cited

UNITED STATES PATENTS

3,270,326  8/1966  Schwartz et al. .................340/174 VC
3,381,279  4/1968  Bergh et al. .......................340/174 SP

*Primary Examiner*—James W. Moffitt
*Attorney*—Louis A. Kline, John J. Callahan and Harry W. Barron

[57] ABSTRACT

A row by column read only memory matrix utilizes etched magnetic rods as the memory elements of the matrix. Each rod is divided into a given number of equilength ordered sections and the rods are positioned so that corresponding sections of each rod are in alignment. In this manner the rods form the rows of the matrix and the aligned sections from the columns of the matrix. A coil is wound around each row of the matrix. Various circuits are shown by which the read only memory can be operated with either a parallel output or a serial output.

10 Claims, 14 Drawing Figures

Patented March 7, 1972

INVENTOR
CEBERN B. TRIMBLE

BY Louis A. Kline
John J. Callahan
Harry W. Barron
HIS ATTORNEYS

Patented March 7, 1972

INVENTOR
CEBERN B. TRIMBLE

BY Louis A Kline
John J. ...
Harry W Barron
HIS ATTORNEYS

INVENTOR
CEBERN B. TRIMBLE
BY Louis A. Kline
John J. Callahan
Harry W. Barron
HIS ATTORNEYS

FIG. 8

INVENTOR
CEBERN B. TRIMBLE
BY Louis A. Kline
John J. Callahan
Harry W. Barron
HIS ATTORNEYS Patented March 7, 1972

INVENTOR
CEBERN B. TRIMBLE

BY Louis A. Kline
John J. Callahan
Harry W. Barron
HIS ATTORNEYS

MAGNETIC ROD READ ONLY MEMORY

This invention relates to a read only memory, and more particularly to a memory utilizing electrically conductive rods which have a thin film of magnetizable material affixed to portions thereof.

In many data processing systems one desires to perform a certain routine many times, such as standard input or output instructions, preparing the format to do the monthly billing for a commercial enterprise, or finding the square root of a number. It is not economical to program the main memory to store the information each time it is desired to perform these routines; rather, it is much better to store this type of information in a read only memory, that is, a memory in which the various bits of information can be read out at electronic speed, but cannot be changed at electronic speed. The advantage of using a read only memory is that it is not necessary to program and store these permanent instructions in the main read/write memory of the computer each time the routine is to be performed. This effectively increases the capacity of the computer. Also, reading a read only memory may be faster than reading a read/write memory. Other advantages of the read only memory are that it is more reliable because the information which is stored therein is nondestructive and the cost per bit of stored information is lower because there need be no write electronics circuits. Further, the power dissipated by such a memory is much less.

Many types of read only memories exist and these include resistive, capacitor and inductives arrays, thin film and metal oxide semiconductors, diode, or magnetic arrays, or various types of photosensitive elements. Each of these have their advantages and disadvantages. One especially desirable type of memory element is a thin film magnetic rod. Such a device is illustrated by U.S. Pat. No. 2,945,217 of Robert D. Fisher et al., and U.S. Pat. No. 3,042,997 of John Anderson, et al., both of which are assigned to the present assignee. The magnetic rods, which are described in the noted patents are devices for a read/write-type memory. However, this does not rule out their utility in a device of the read only type. It has been shown in U.S. Pat. No. 3,270,326 by S. J. Schwartz, et al., issued Aug. 30, 1966 and assigned to the present assignee, that were one etches away portions of the magnetic material affixed to each rod, a read only memory can be constructed, such that a "0" bit is defined by the portion of the rod in which the magnetic material has been etched away and a "1" bit is defined by the portion of the rod in which the magnetic material remains.

In accordance with one aspect of the present invention there is provided a magnetic memory which includes a plurality of elongated memory elements arranged in a bundle. Each of the elements are divided in corresponding sections along the respective longitudinal axes thereof. The elements are aligned with respect to one another so that any given section of any given element is substantially in the same longitudinal position in the bundle as the sections of the remaining elements corresponding thereto. At least one of the sections of one of the elements has a material, capable of being magnetized, affixed thereto. There is also provided a nonconductive casing having a plurality of individual windings wound therearound. The casing is positioned around the bundle so that there is a winding aligned with at least a portion of each aligned section.

In accordance with another aspect of the invention, there is provided a read only memory for providing signals indicative of predetermined logical bits of one or another type which are permanently stored in the memory. The predetermined logical bits form a predetermined digital word. This memory includes a plurality of elongated electrical conducting nonmagnetic substrates, each of which is divided into a given number of corresponding longitudinally ordered sections. The substrates are aligned to provide a coordinally arranged row by column matrix in which the substrates determine the rows and the corresponding sections determine the columns. At least one of the sections of one of the rods has a material capable of being magnetized affixed thereto, whereby the presence of said material indicates a bit of said one type and the absence of said material indicates a bit of the other type. The predetermined word is determined by the bits present in at least a portion of one of the rows or one of the columns of the matrix. A common conductor is also provided which has one end coupled to a corresponding end of each of the substrates. The common conductor is positioned with respect to the substrates so that a current caused to flow through any one of the substrates in one direction will flow through the common conductor in substantially the opposite direction. There is also provided a plurality of windings, each of which surround all of the substrates and the common conductor. Each of the windings is aligned with a different column of the matrix.

The novel features of the invention, as well as the invention itself, both as to its organization and as to its method of operation, will be understood in detail from the following description, when considered in connection with the accompanying drawings, in which similar reference numerals refer to similar elements. In the drawings.

Figures 1, 2:
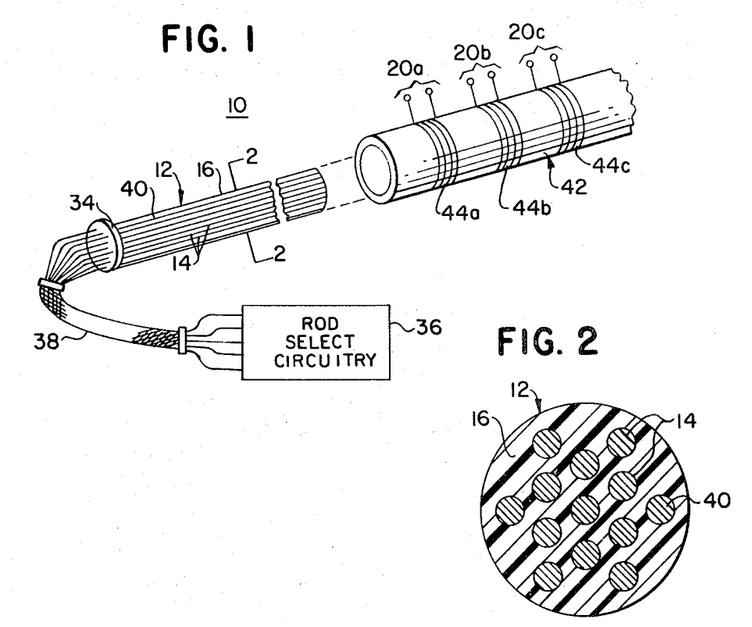
FIG. 1 shows an arrangement for a read only memory.
FIG. 2 is a cross section taken along lines 2—2 of FIG. 1.

Referring now FIG. 1 there is shown an arrangement for a read only memory 10 which includes a bundle 12 composed of a plurality of magnetic rods 14. There may be any number of these rods 14, 120 of them being an example. The rods 14 are encased in a nonmagnetic and nonelectrical conducting material, such as a plastic resin 16, to form bundle 12. This material holds each of the rods 14 in a fixed position with respect to the remaining rods 14 in the bundle 12 such that each of the rods 14 are substantially parallel to one another along their respective longitudinally axis.

Reference to FIG. 2 shows a cross section of bundle 12 taken along lines 2—2. In FIG. 2 it is seen that the rods 14 are positioned in bundle 12 in no particular ordered manner, that is, they are around the outer edge of bundle 12 as well as in the interior thereof. Further, the plastic resin 16 electrically separates each rod 14 from the remaining rods (except as hereinafter explained) as well as holding them in place parallel to one another.

Figure 3:
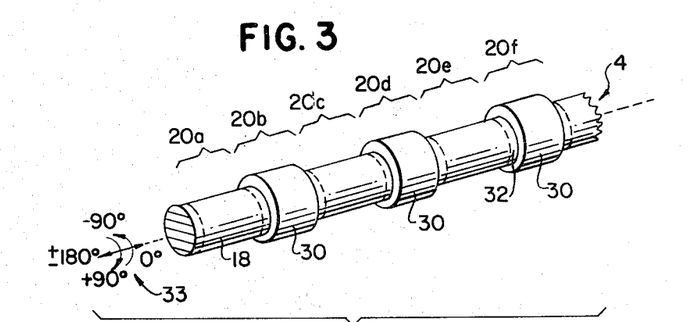
FIG. 3 shows one of the rods shown in FIG. 1.

Each of the rods 14 is divided into a plurality of longitudinally ordered sections 20a–20f (FIG. 3). Each of the rods 14 are longitudinally positioned with respect to one another so that corresponding sections of each rod are in alignment. Each of these sections of each rod 14 defines a single binary bit. This may be accomplished by providing a nonmagnetic substrate, such as copper, and affixing a magnetic material such as an iron-nickel alloy, by electrodepositing techniques to at least a portion of those sections where the bit is to be a binary 1 and to have no magnetic material in those sections where the bit is to be a binary 0.

Referring to FIG. 3, there is shown a portion of any given rod 14 in which the binary code 010101 is shown. Rod 14 includes a substrate 18 which is divided into six equilength sections 20a, 20b, 20c, 20d, 20e, and 20f. These sections are positioned adjacent to one another along the longitudinal axis of rod 14. Since the binary code in the portion of rod 14 shown in FIG. 3 is 010101, at least portions of sections 20b, 20d and 20f have a magnetic material 30 affixed thereto and sections 20a, 20c and 20e are devoid of magnetic material. The magnetic material 30 in sections 20b, 20d, and 20f does not cover the whole area of those sections, but rather an area such as area 32 in section 20f remains on each side of the magnetic material 30.

One manner of achieving this magnetic material or no magnetic material structure is to initially coat each of the substrates 18 with the magnetic material and to thereafter etch away those portions of rod 14 where no magnetic material is desired, such as in sections 20a and 20c and area 32. This etching may be performed by conventional etching techniques.

In rod 14, the diameter of the substrate 18 may be approximately 10 mils and the thickness of the magnetic material 30 may be approximately 10,000 angstroms. The rods 14 may be isotropic, that is, there is no easy direction of magnization built into the rod. However due to the geometry of the rod, magnization in the longitudinal direction may be slightly easier than magnization in the circumferential direction; thus the rods may have a slight longitudinal anisotropy.

For convenience of description hereinafter, it will be assumed that a direction which is parallel to the longitudinal axis and towards the right will define a 0° direction; a direction which is parallel to the longitudinal axis and towards the left will define a ±180° direction; a direction which is circumferential clockwise (looking from the left) about the longitudinal axis will define a +90 a direction which is circumferential counterclockwise about the longitudinal axis will define a −90° direction. A direction diagram 33 is shown to the left of rod 14 in FIG. 3.

Referring back to FIG. 1, bundle 12 is connected to a holder 34 in such a manner that each of the rods 14 will protrude from one end of the bundle 12 and fit into one of a plurality of sockets (not shown) of the holder 34. In this manner, if one desires to change the read only memory, it becomes a simple matter to remove an old bundle and insert a new one.

Rod select circuitry 36 is shown as having a plurality of terminals which may be equal to the number of sockets in the holder 34, and each of the terminals of the rod select circuitry 36 is coupled through a lead in a multilead wire 38 to one of the sockets in the holder 34; thus an electrical path exists between each terminal of rod select circuitry 36 and a particular rod 14.

One of the rods in the bundle 12 is a common rod 40 and is completely devoid of magnetic material. One end of the rod 40 is coupled to the ends remote from the holder 34 of each of the rods 14. The other end of the rod 40 is coupled through a socket in the holder 34 and a lead of the wire 38 to a return terminal of the rod select circuitry 36. In this manner, current will flow from at least one selected output terminal of the rod select circuitry 36, through the wire 38 and the holder 34, through at least one selected rod 14, back to the rod 40 (hereinafter called a common conductor), the holder 34, the wire 38, and back to the rod select circuitry 36.

The bundle 12 is inserted inside a casing 42, which may be of any nonelectrical and nonmagnetic material, such as plastic. The casing 42 has, wound therearound, a plurality of windings 44, which are so positioned on the casing 42 that each winding 44 is aligned with a different one of the corresponding sections of each rod 14 in the bundle 12 when the bundle 12 is completely inserted into the casing 42. The ends of each of the coils 44 may be coupled either to a sense amplifier or to a current source, depending upon the desired mode of operation of the memory 10.

Figure 4:
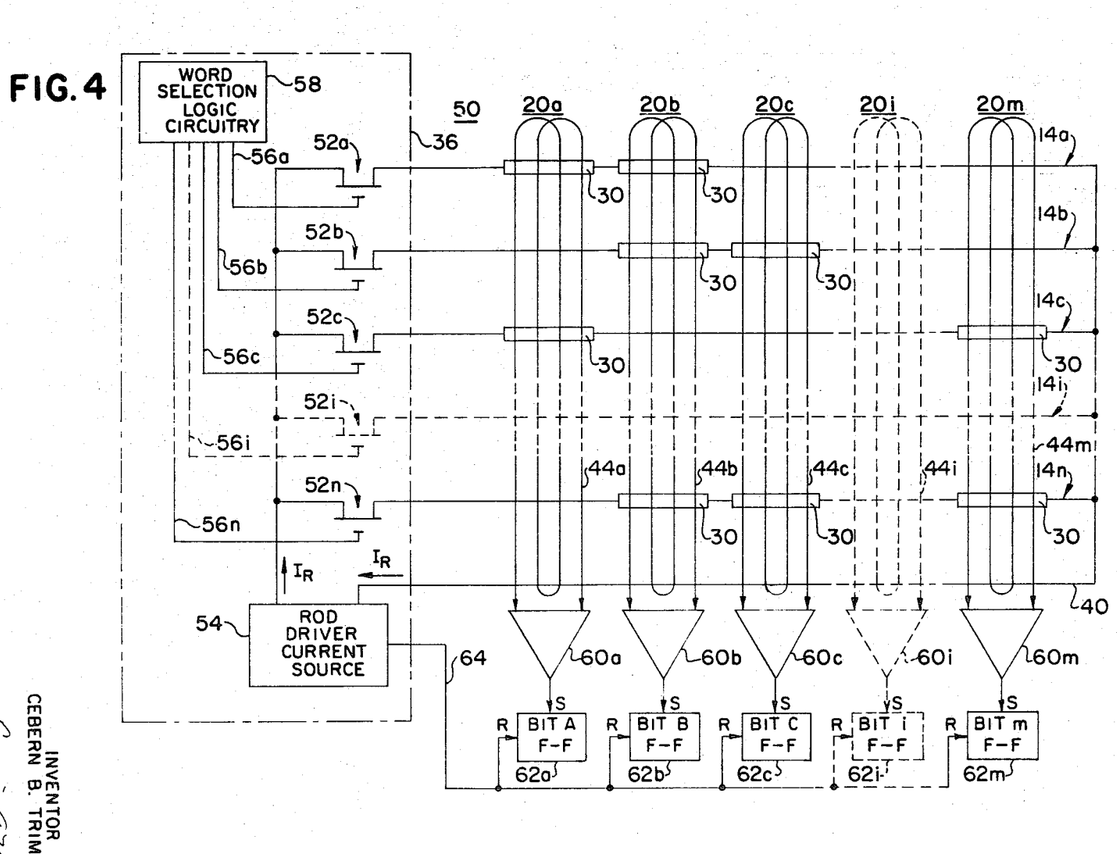
FIG. 4 shows a circuit diagram, partially in block form, for operating the memory shown in FIG. 1.
Figure 6:
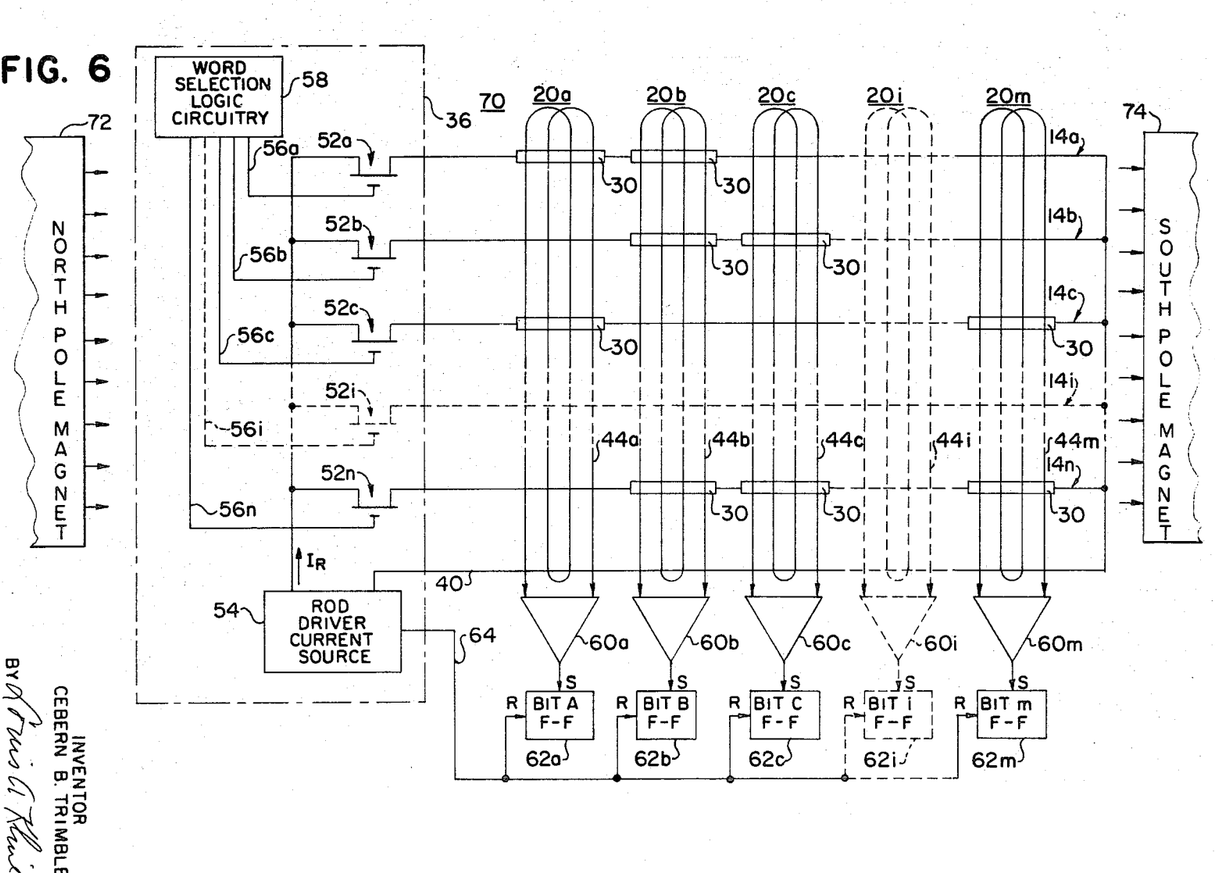
FIG. 6 shows a second circuit diagram, partially in block form, for operating the memory shown in FIG. 1.
Figure 8:
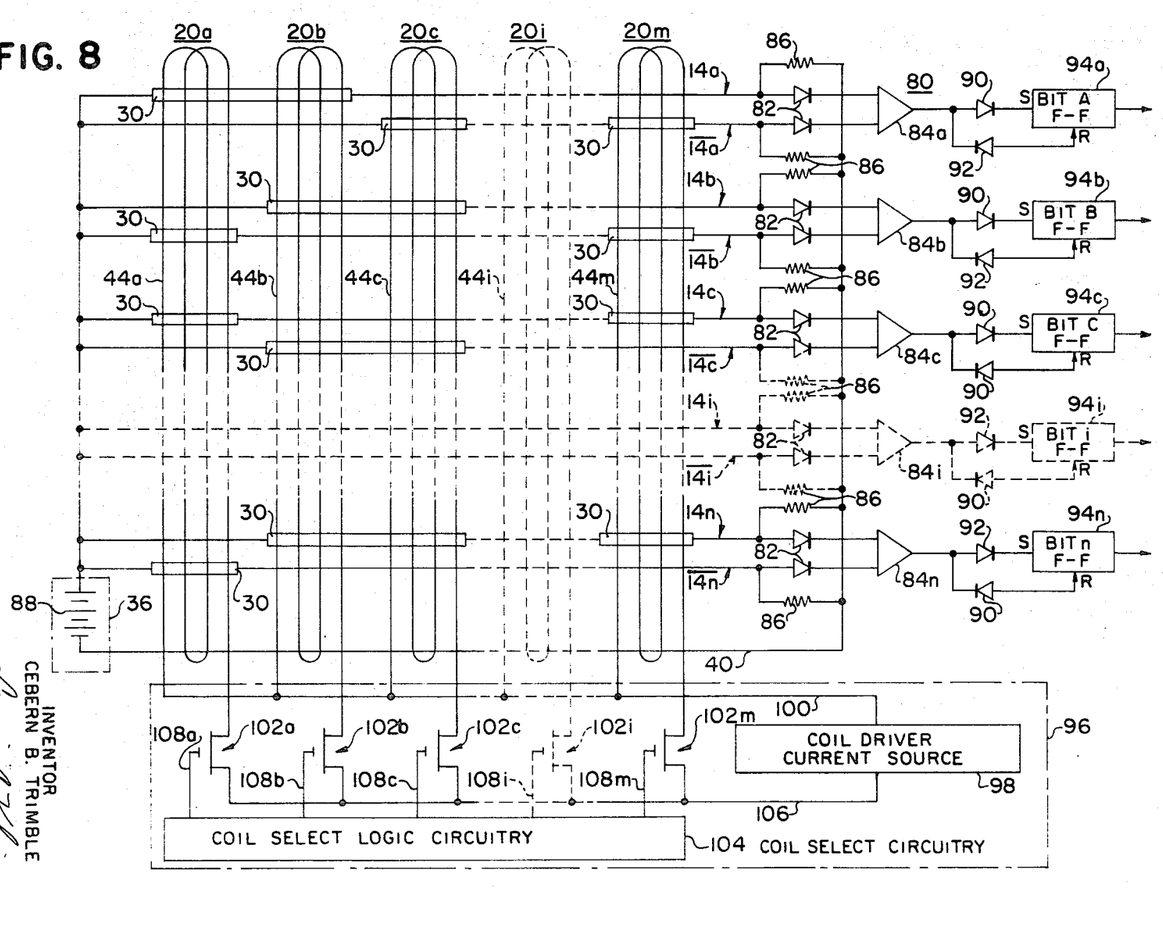
FIG. 8 shows another circuit diagram, partially in block form, for operating the memory shown in FIG. 1.

FIGS. 4, 6, and 8 show three different systems by which a plurality of binary bits, which constitute a single digital word, can be read in parallel. Referring specifically to the system 50 in FIG. 4, the bits of a selected word are detected by causing the flux $\phi$ in the magnetic material 30 of the selected word to change direction by 180°. The system 50 includes N rods, 14a to 14n, each of which defines a particular digital word in the memory. Each of these words in turn is made up of M bits of information; therefore each of the rods 14a to 14n is divided into M sections 20a to 20m. In this manner, the rods 14a to 14n and the sections 20a to 20m define a N row by M column matrix, where the rows are determined by the various rods 14a to 14n and the columns are determined by the corresponding sections 20a to 20m in each of the rods.

Referring now to the rod 14a, which represents the digital word A, it is seen that its sections 20a and 20b have magnetic material 30 affixed thereto. This material represents a 1 bit in those sections of the rod 14a. The remaining sections, 20c to 20m, of the rod 14a have no magnetic material affixed thereto and therefore represent 0 bits in that portion of the rod 14a. Thus the digital word A, which is defined by the rod 14a, is 1100. Similarly, in the rod 14b, which represents the digital word B, only its sections 20b and 20c have magnetic material 30 affixed thereto, and therefore the word B is 0110. Similarly, the word C, which is represented by the rod 14c, is 1001 because its sections 20a and 20m have the magnetic material 30 affixed thereto, and the word N, which is represented by the rod 14n, is 0111 because its sections 20b, 20c, and 20m have magnetic material 30 affixed thereto.

The ends of each of the rods 14a to 14n which are remote from the holder 34 are all coupled together and to the common conductor 40. The other end of each of the rods 14a to 14n is connected through the holder 34 and the wire 38 (which are not shown in the remaining figures) to a main electrode of a corresponding field effect transistor 52a to 52n, which may be a part of the rod select circuitry 36. The other main electrodes of the transistors 52a to 52n are all coupled together and to the output of a rod driver current source 54. The other end of the common conductor 40 is coupled to the return input of the rod driver current source 54. The gate electrodes of each of the transistors 52a to 52n are coupled by respective lines 56a to 56n to an output word selection logic circuitry 58. The word selection logic circuitry 58 causes one of the transistors 52a to 52n to act as a closed switch, while the remainder of the transistors 52a to 52n act as open switches. The rod driver current source 54 and the word selection logic circuitry 58 may also be a part of the rod select circuitry 36. The current provided by the rod driver current source 54 can thus flow through the one of the transistors 52a to 52n made conductive by the word selection circuitry 58, through the one of the rods 14a to 14n associated with the selected transistor, through the common return 40 and back to the rod driver current source 54.

There is also provided in the system 50 a plurality of coils 44a to 44m, which are respectively wound around portions of each of the sections 20a to 20m in the system 50. Each of the coils 44a to 44m may have any desired number of turns, 10 being an example. The two ends of each coil 44a to 44m are coupled to the two inputs of a respective sensing amplifier 60a to 60m. The amplifiers 60a to 60m may be differential amplifiers which provide a voltage at their outputs whenever a voltage difference exists between their two inputs. Each of the outputs of the amplifiers 60a to 60m is applied to the set (S) input of a respective flip-flop 62a to 62m. A signal from the rod driver current source 54 is applied to a reset (R) input of each of the flip-flops 62a to 62m.

Figure 5:
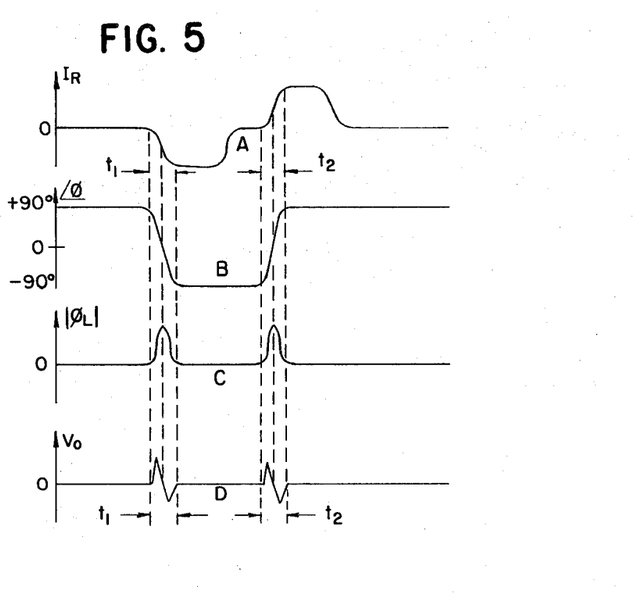
FIG. 5 is a series of waveforms useful in understanding the operation of the circuit shown in FIG. 4.

Referring now to FIG. 5, an explanation of the operation of the system 50 will now be given. It will first be assumed that the transistor 52a is made conductive by a signal appearing at the output 56a of the word selection logic circuitry 58. Thus, the current from the rod driver current source 54 will flow through the rod 14a. It will also be assumed that the initial direction of the flux $\phi$ in the material 30 of sections 20a and 20b of the rod 14a (these being the only sections of the rod 14a having material 30 affixed thereto) will be clockwise with respect to the longitudinal axis of the rod 14a; that is, in the +90° direction. Referring to FIG. 5A, the current $I_R$ provided by the rod driver current source 54 is a negative pulse followed by a positive pulse, where the leading edge of the negative pulse occurs during time $t_1$ and the leading edge of the positive pulse occurs during time $t_2$. Further, the magnitude of both the positive and negative pulses of current $I_R$ is sufficient to cause the direction of the flux $\phi$ to change.

When the negative pulse from the rod driver current source 54 is applied through the rod 14a, it will cause the direction of the flux $\phi$ appearing in the magnetic materials 30 of the rod 14a to be switched from the +90° direction to the −90° direction. This flux direction change will occur substantially simultaneously with the leading edge of the positive pulse from the rod driver current source 54; that is, during time $t_1$. The direction of the flux $\angle \phi$ is shown by FIG. 5B, and, as seen during time $t_1$, it changes from +90° to −90°.

From FIG. 5C, which shows the magnitude of the longitudinal component of the flux $|\phi_L|$, it is seen that during time $t_1$, in which flux direction change occurs, the magnitude of the flux $|\phi_L|$ along the longitudinal direction rose quickly and then decreased back to zero. This occurs because each line of flux $\phi$ rotates from the +90° direction to the −90° direction in substantially the same longitudinal direction. The reason why all flux lines $\phi$ rotate through the same longitudinal direction is due to certain magnetic effects external to the system 50, such as the earth's magnetic field, and these effects make it easier for the flux $\phi$ to rotate in one direction than in the other direction.

As the longitudinal component of the flux $|\phi_L|$ rises and decreases quickly, it causes a voltage $V_o$, equal to the time derivative of the flux $\phi$, to exist in each of the coils 44a and 44b; these voltages $V_o$ are shown in FIG. 5D by the first (left) signal therein. These voltages are detected and appear at the outputs of the amplifiers 60a and 60b and cause the flip-flops 62a and 62b to be set to their 1 state.

Since no magnetic material 30 is affixed to sections 20c to 20m of the rod 14a, the amount of flux therein due to current $I_R$ will be much smaller than the amount of flux in the magnetic material 30 of sections 20a and 20b. In view of this, a small noise voltage will be induced in the coils 44c to 44m as the current $I_R$ changes. However, since current $I_R$ flows through the common conductor 40 in a direction opposite to the direction in which it flows through the rod 14a, an equal, but opposite direction, flux will exist in sections 20c to 20m of the common conductor 40. This common conductor flux will induce a voltage in the coils 44c to 44m which is equal in magnitude to and opposite in polarity from the rod 14a induced voltage in those coils. These voltages will cancel out one another, so the output of the amplifiers 60c to 60m will be 0 volts, and the flip-flops 62c to 62m will not be triggered to their 1 state. In this manner, the common mode noise voltage due to the current pulse is eliminated. Hereinafter, the operation in those sections devoid of magnetic material will be neglected.

The trailing edge of the negative pulse of current $I_R$ will have no effect on the direction of the flux $\angle \phi$ in the materials 30 of the rod 14a. However, as soon as the leading edge of the positive pulse of current $I_R$ occurs, as shown during time $t_2$ in FIG. 5, the direction of the flux $\angle \phi$ in each of the materials 30 of the rod 14a will again change back to the initial +90° clockwise direction. The flux $\phi$ will remain in this direction as long as no negative current flows through the rod 14a. Therefore, the rod 14a is ready to be read again as soon as the transistor 52a is made conductive and a negative pulse from the rod driver current source 54 is applied through the rod 14a. When the direction of the flux $\angle \phi$ changed during time $t_2$, it created a second sharp rise and fall in the longitudinal component of the flux $|\phi_L|$ which again is detected by the amplifiers 60a and 60b. However, since the flip-flops 62a and 62b were already set in their 1 states, this second (right) pulse will have no effect on them.

After the leading edge of the negative pulse from the rod current $I_R$ occurs, a pulse will be applied from the rod driver source 54 through the pulse will line 64 and to the reset (R) inputs of the flip-flops 62a to 62m. This pulse resets each of the flip-flops 62a to 62m back to their 0 states, if they were not already there. Thus, when the word selection logic circuitry 58 chooses another word, the flip-flops 62a to 62m will be ready to produce that word.

Thus, by looking at the outputs of the flip-flops 62a to 62m of the system 50, one can read the bits of each word in parallel, thereby having a relatively high-speed read only memory. One disadvantage of the system 50 is that it requires two pulses to accomplish the reading of each word (changing and thereafter rechanging the direction of the flux $\phi$ in each of the sections 30 of the word 14a). Where speed is not a factor in the operation of the read only memory, the system 50 is quite satisfactory. However, if one could eliminate the reset (positive) pulse, the speed of operation of the system 50 could be increased by approximately two times.

Reference to FIG. 6 shows a system 70, in which the reset pulse is not required for resetting the direction of the flux in the material 30 of the selected words. The system 70 differs from the system 50 only in that the negative-going pulses provided by the rod driver current source 54 are not required and in that a pair of magnets 72 and 74 (72 being a north pole and 74 being a south pole) are provided. The direction of the magnetic field provided by the magnets 72 and 74 is substantially parallel to the longitudinal axis of the rods 14a to 14n.

Figure 7:
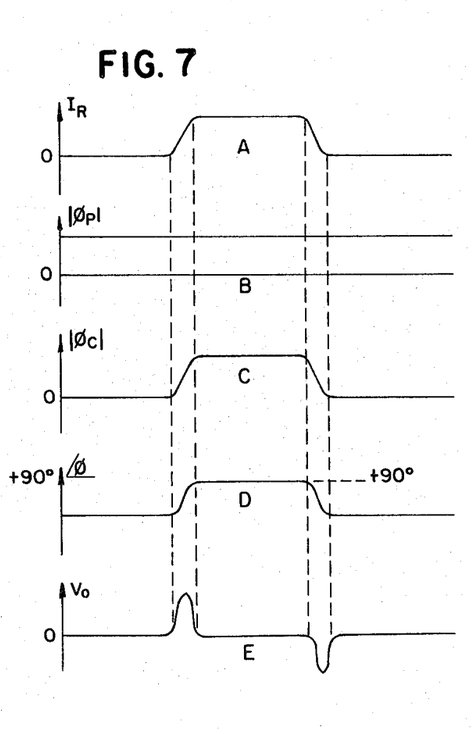
FIG. 7 is a series of waveforms useful in understanding the operation of the circuit shown in FIG. 6.

Referring to FIG. 7, where waveforms useful in understanding the operation of the system 70 are shown, and specifically FIG. 7D, where the direction of the flux $\angle \phi$ in the materials 30 of the rod 14a is shown, it is seen that the initial direction of the flux $\angle \phi$ in each of the sections 30 of the rod 14a will be in the 0° direction. This is due to the fact that the magnets 72 and 74 cause a permanent flux component $|\phi_P|$ (see FIG. 7B) to flow in the 0° direction. When the current pulse, as seen in FIG. 7A, from the rod driver current source 54 occurs, its leading edge will cause a circumferential flux component $|\phi_C|$ (see FIG. 5C) to occur in the materials 30. The magnitude of the permanent flux component $|\phi_P|$ due to the magnetic field produced by the magnets 72 and 74, and the magnitude of the circumferential flux component $|\phi_C|$ due to the current pulse provided by the current source 54 are such that the permanent flux component $|\phi_P|$ is much smaller than the circumferential flux component $|\phi_C|$. Thus the direction of the total flux $\angle \phi$ will be in substantially the +90° direction after the pulse of current $I_R$ occurs. This flux direction change from 0° to substantially +90° causes a voltage $V_o$ to be induced in the coils 44a to 44m. The voltage $V_o$, which is shown in FIG. 7E, is detected by the amplifiers 60a to 60m, and therefore the particular flip-flop 62a to 62m is set to its 1 state. After the trailing edge of the pulse of the current $I_R$ occurs, the circumferential flux component $|\phi_C|$ returns to zero. Therefore, the longitudinal flux component $|\phi_L|$ due to the magnets 72 and 74 again becomes predominant and causes the direction of the flux $\angle \phi$ to revert to the 0° direction. This causes a second voltage $V_o$ pulse, which is applied to, but ignored by, the flip-flops 62a–62bh. After the trailing edge of the pulse of current $I_R$, a pulse appears on the line 64 to reset the flip-flops 62a–62m. Thus, the second pulse, described with respect to the system 50, is no longer necessary when one uses the magnets 72 and 74, as in the system 70.

Referring now to FIG. 8, there is shown a system 80, in which the output is taken in parallel for each word, but where the word is defined as the bits in a particular section 20a–20m of the several rods 14a–14n. Another difference in the system 80 is that each one of the rods 14a–14n is replaced by a pair of complementary rods 14a–14n and $\overline{14a-14n}$. Each complementary pair of rods will have magnetic material 30 affixed to one or the other of the pair of rods in each section 20a–20m. If the magnetic material 30 is to represent a 1 bit in a particular section, it will occur in the rods 14a–14n in that particular section, and, if the magnetic material 30 in the particular section is to represent a 0 bit, will occur in the rods $\overline{14a-14n}$ in that particular section. For instance, the complementary set of rods 14a and $\overline{14a}$ represent the digital bits of 110—0 and the complementary set of rods 14n and $\overline{14n}$ represent the digital bits of 011—1.

Each set of complementary rods is connected through a diode 82 to the two inputs of a respective sensing amplifier 84a—84, which may be a differential amplifier. The diodes 82 are poled in such a direction that they will pass a current flowing in the 0° direction and will block the current flowing in the —180° direction. Each of the rods 14a—14n and $\overline{14a}$-$\overline{14n}$ is also coupled through a resistor 86 to the common conductor 40. The common conductor 40 is coupled to the negative side of a source of DC power, such as a battery 88. The positive side of the battery 88 is coupled to each of the rods 14a—14n and $\overline{14a}$-$\overline{14n}$. The current provided by the battery 88 is sufficient to cause a flux $\phi$ to be in the +90° direction in each magnetic material 30 in the system 80.

The output of each of the amplifiers 84a—84n is coupled through a pair of oppositely poled diodes 90 and 92 to a respective flip-flop 94a—94n. Each diode 90 couples the output of one of the amplifiers 84a—84n to the set (S) input of the particular flip-flop 94a—94n with which that one amplifier is associated. Each diode 90 is poled to pass only a positive current; that is, one in the 0° direction. Each diode 92 couples the output of one of the amplifiers 84a—84n to the reset (R) input of the particular flip-flop 94a—94n with which that one amplifier is associated. Each diode 92 is poled to conduct a negative current; that is, one in the —180° direction.

In the system 80, there is also provided coil select circuitry 96, which includes a coil driver current source 98, which provides a positive-going current pulse $I_c$ on the line 100. This pulse is applied to a particular one of the coils 44a—44m which is determined by which one of the transistors 102a—102m is made conductive by coil select logic circuitry 104. The pulse appearing on the line 100 flows through the one of the coils 44a—44 associated with the particular one of the transistors 102a—102m made conductive, back to the line 106 and back to the coil driver current source 98. This current will have a magnitude sufficient to cause the direction of the flux $\phi$ in the magnetic materials 30 which are in the same section of the one of the coils 44a—44m to change from a +90° direction (due to current from the battery 88) to substantially a 0° direction.

The particular one of the transistors 102a—102m which is made conductive by the circuitry 104 will determine the particular word that is to be read by the flip-flops 94a—94n. The bits of that particular word will be those in the various rods 14a—14 and $\overline{14a}$-$\overline{14n}$. For instance, if it is assumed that the transistor 102m is made conductive by the application of a pulse on the line 108m from the coil select logic circuitry 104, then the word 001—1 defined by section 20m will be read out by the flip-flops 94a—94n.

Figure 9:
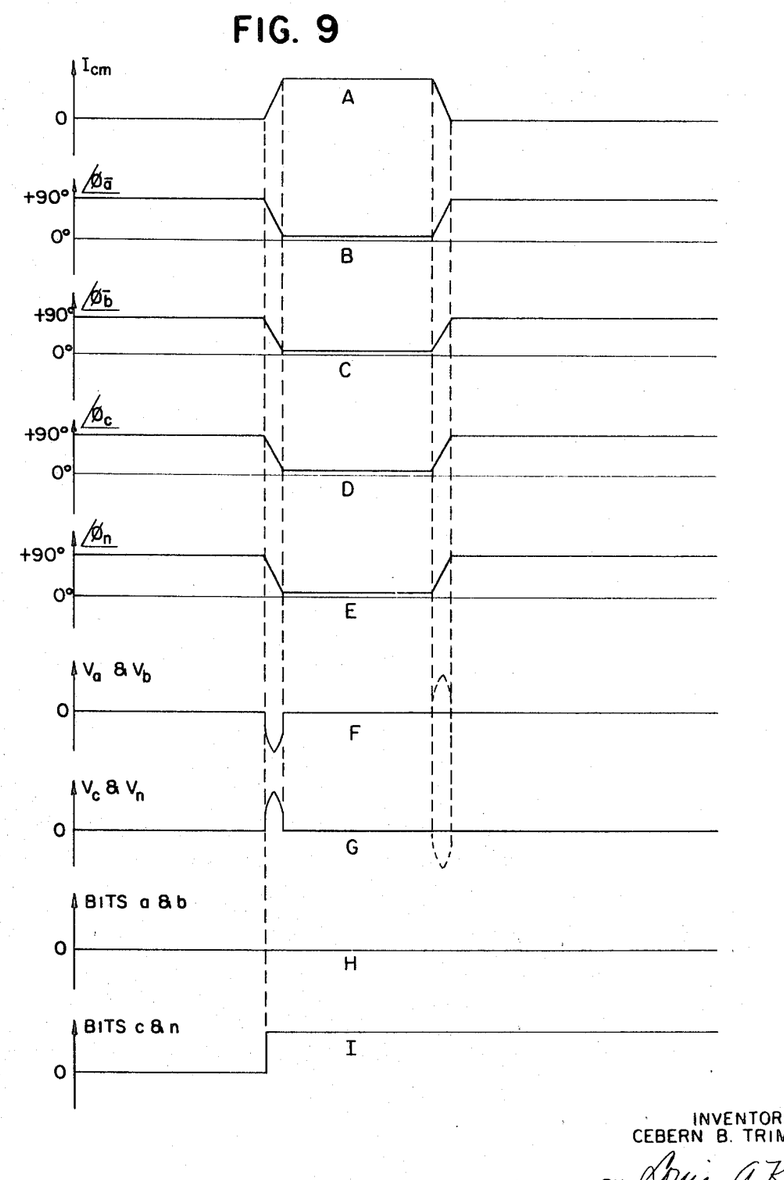
FIG. 9 shows a series of waveforms useful in understanding the operation of the circuit shown in FIG. 8.

Referring now to FIG. 9, a series of waveforms useful in understanding the operation of the system 80 is shown. FIG. 9A shows the current $I_{cm}$ which is applied through the coil 44m. The DC current which flows through each of the rods causes a circumferential flux component $|\phi_c|$ in the +90° direction to exist in those sections which have magnetic material 30 affixed thereto prior to current pulse $I_{cm}$. However, when the current pulse $I_{cm}$ appears in the coil $I_{cm}$, its magnitude is such that it will cause a longitudinal flux component $|\phi_L|$ to exist in each of the magnetic materials 30 in section 20m. This longitudinal flux component $|\phi_L|$ is much larger than the circumferential flux component $|\phi_c|$, and thus the direction of the flux $\angle\phi$ will be substantially parallel to the longitudinal axis of the rods in the substantially 0° direction. For instance, FIG. 9B shows the direction of the flux $\angle\phi_{\bar{a}}$ in the material 30 of the rod $\overline{14a}$ in section 20m. It is seen that, prior to the current pulse $I_{cm}$, the direction of the flux $\angle\phi_a$ was +90 degrees; however, after the current $I_{cm}$ occurs, the direction of the flux $\angle\phi_{\bar{a}}$ changed to substantially the 0-degree direction.

Once the current pulse $I_{cm}$ returns to zero, the direction of the flux $\angle\phi_n$ in the magnetic material 30 of section 20m in the rod 14a returns to the +90° direction due to the current supplied by the battery 88. Similarly, FIGS. 9C, 9D, and 9E show the direction of the flux $\angle\phi_{\bar{b}}$, $\angle\phi_c$, and $\angle\phi_n$, the magnetic materials 30 of section 20m in the rods 14b, 14c, and 14n. Here again it is seen that, during the times the current $I_{cm}$ is positive in the coil 44m, the direction of the flux is substantially 0°, and, when the current no longer exists, the flux returns to the +90° direction due to the current supplied by the battery 88.

The change in direction of the flux from the +90° direction to the substantially 0° direction causes a voltage pulse of positive polarity to be induced along the particular rod in which the flux direction change occurred. When this occurs, a voltage difference will exist between the two inputs to each of the amplifiers 84a—84m due to the voltage induced along one of the two rods of the corresponding pair. It should be noted that, when the current $I_{cm}$ returns to zero, a pulse of negative polarity will be induced in the particular rod; however, this negative pulse will be blocked by the presence of the diodes 82, and, therefore, only the first pulse will be applied to the amplifier 84a—84bh. The output signal from the amplifier 84a—84m will have a polarity depending on which one of its two inputs has the voltage change applied thereto. For example, in the amplifier 84a, the voltage was increased at the input coupled to the rod $\overline{14a}$, and therefore the lower input became more positive than the upper input. In this situation, a negative voltage is applied at the output of the amplifier 84a, as seen in FIG. 9F. This negative voltage will pass through the diode 92 to reset the flip-flop 94a, if it is not already reset. Thus, the output from the flip-flop 94a, as seen in FIG. 9H, will be 0 volts, indicative of a 0 bit for the Ath bit of the word defined by section 20m. The rods 14b and $\overline{14b}$, the amplifier 84b, and the flip-flop 94b operated in the same manner as just described.

On the other hand, the amplifiers 84c and 84n will receive a voltage pulse at their upper inputs, since the material 30 is affixed to the rods 14c and 14n in section 20m. In this situation, a positive voltage will appear at the outputs of the amplifiers 84c and 84n, as seen in FIG. 9G. This voltage will pass through the diodes 90 and be applied to the set (S) input of the flip-flops 94c and 94n, thereby causing them to provide a positive voltage signal at their outputs, as seen in FIG. 9I; this positive voltage is indicative of a 1 bit in the Cth and Nth position of the word defined by section 20m. It should be noted that, if the next signal provided at the output of either amplifier 84c or 84n is another 1 bit, it will be applied to the set (S) input of the flip-flop 94c or 94n, and no change will occur, since these flip-flops are already set; however, if it is a 0 bit, the negative voltage appearing at the output of the amplifier 84c and 84n will pass through the diodes 92 and reset the flip-flop 94c or 94n to the 0 state, thereby indicating the presence of the 0 bit.

The advantage of a system 80 is that a 1 bit will be indicated by a positive voltage at the output of the particular amplifier 84a—84, and a 0 bit will be indicated by a negative voltage, as opposed to the zero voltage of the other systems, at the output of the particular amplifier 84a—84n. This increases signal to noise ratio, so that the signal becomes greater in comparison to the noise. Therefore, there is less chance of a mistake occurring due to a transient noise voltage appearing for one reason or another in a particular rod.

Figure 10:
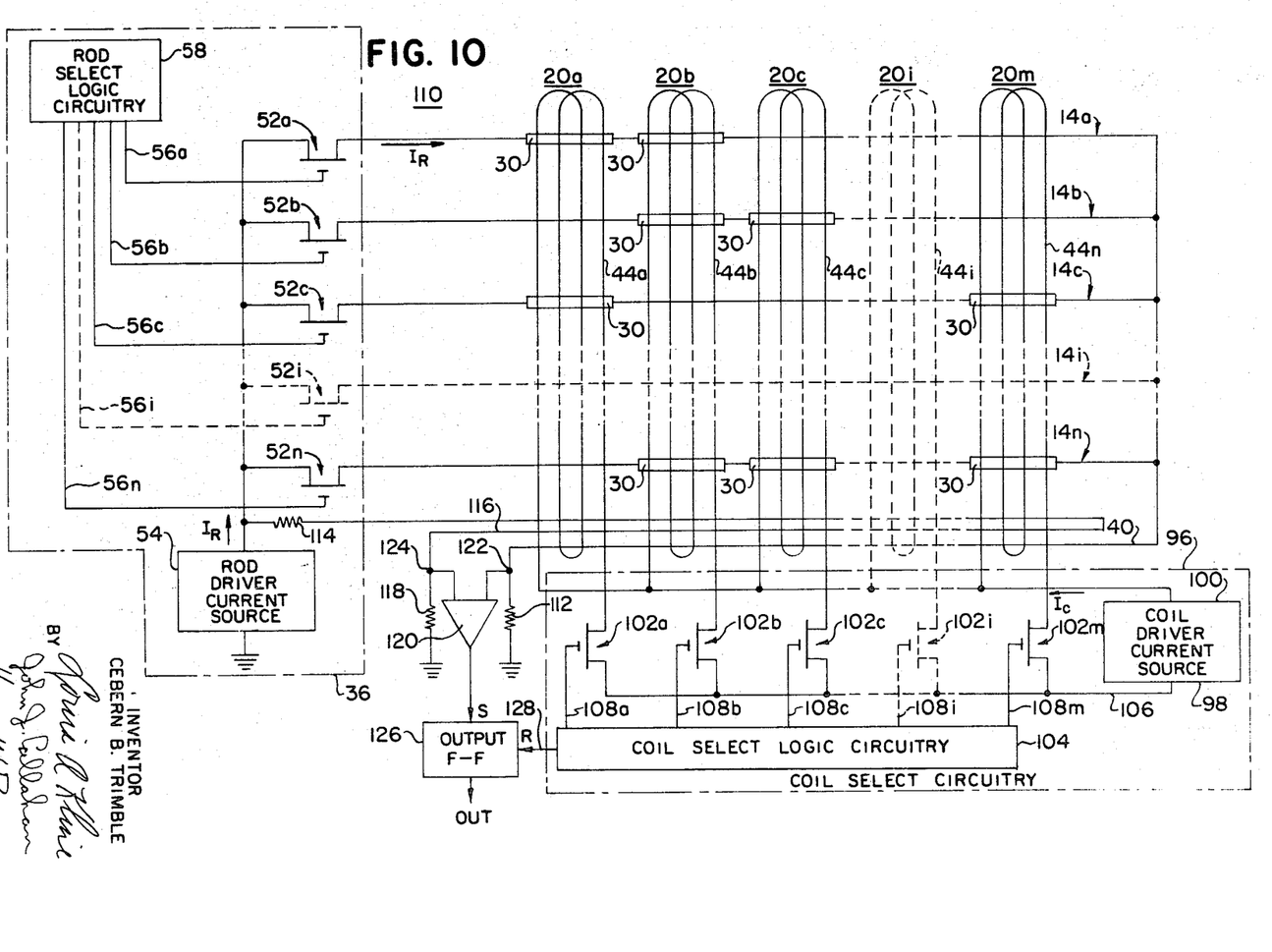
FIG. 10 shows still another circuit diagram, partially in block form, for operating the memory shown in FIG. 1.
Figure 13:
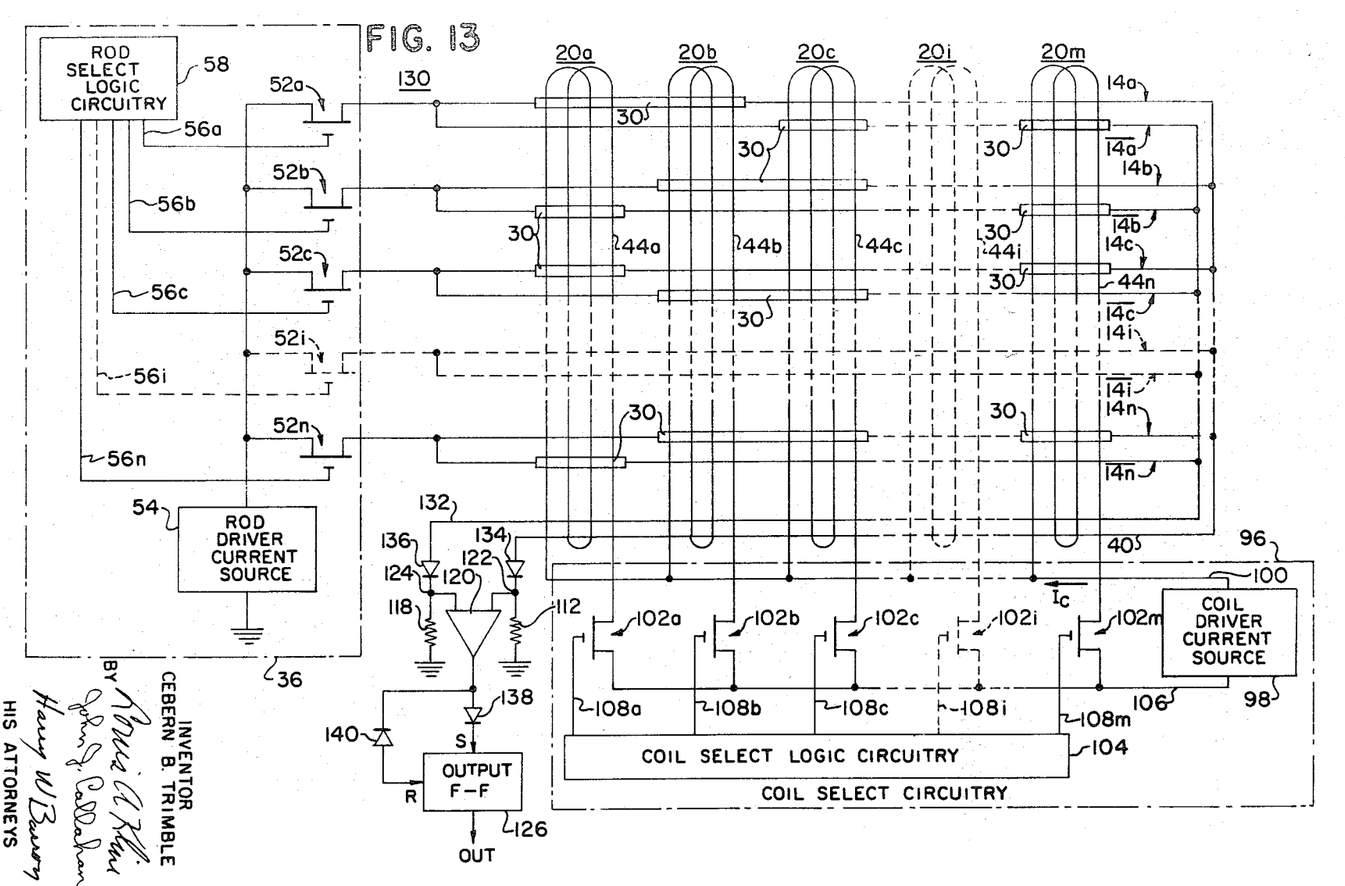
FIG. 13 shows another circuit diagram partially in block form, for operating the memory shown in FIG. 1.

Referring now to FIGS. 10 and 13, two systems are shown, in which the bits of a selected word may be read out in a serial manner, rather than the parallel manner, previously described. Referring specifically to FIG. 10, a system 110 is shown. In the system 110, the common conductor 40 is returned to the rod driver current source 54 through the resistor 112 and ground. The current from the rod driver current source 54 is also applied through a resistor 114 and a second conductor 116 and through a second resistor 118 and ground back to the rod driver current source 54. The second conductor 116 is applied through the center of each of the windings 44a—44 in such a manner that current will flow in one direction through half of the conductor 116 and in the opposite direction through the other half of the conductor 116. In this manner, the common mode noise which may be inductively coupled from the coils 44a–44m to the rods 14a–14n is cancelled in the same manner as the current in the common conductor 40 caused the common mode noise due to the rod current to be cancelled in the systems 50, 70, and 80.

A sensing amplifier 120, having two inputs, is also included in the system 110. The amplifier 120, which may be a differential amplifier, is connected in such a manner that one of its two inputs is connected to a junction point 122 and the other one of the inputs is connected to a junction point 124. The junction point 122 is the junction of the line 40 and the resistor 112, and the junction point 124 is the junction of the line 116 and the resistor 118. The output of the amplifier 120 is connected to the set (S) input of the flip-flop 126, and the output of the flip-flop 126 is the serial ordered bits of the selected word, which in the case of the system 110 will be the bits along any one of the rods 14a –14n. The reset (R) input of the flip-flop 126 is connected through a line 128 to the coil select logic circuitry 104, which provides a signal after each bit has been read.

The current provided by the rod driver current source 54 is a direct current and will be applied through whichever of the rods is selected by the rod select logic circuitry 58, causing one of the transistors 52a–52n to be made conductive. Thus, the current through each of the rods 14a–14n will appear as a pulse which has a leading edge occurring before the first bit of the word defined by the selected rod is read and which has a trailing edge which occurs after the last bit of the word defined by the selected rod has been read. The resistor 114 is selected to have a value such that the voltage appearing in the junction 124 is equal to the voltage appearing at the junction 122 as long as the flux in any of the particular materials 30 of the selected rod remains constant.

The coil select logic circuitry 104 causes the transistors 102a–102m to be made conductive a one at a time in succession. Any well-known logic circuitry can be used to accomplish this.

Figure 11:
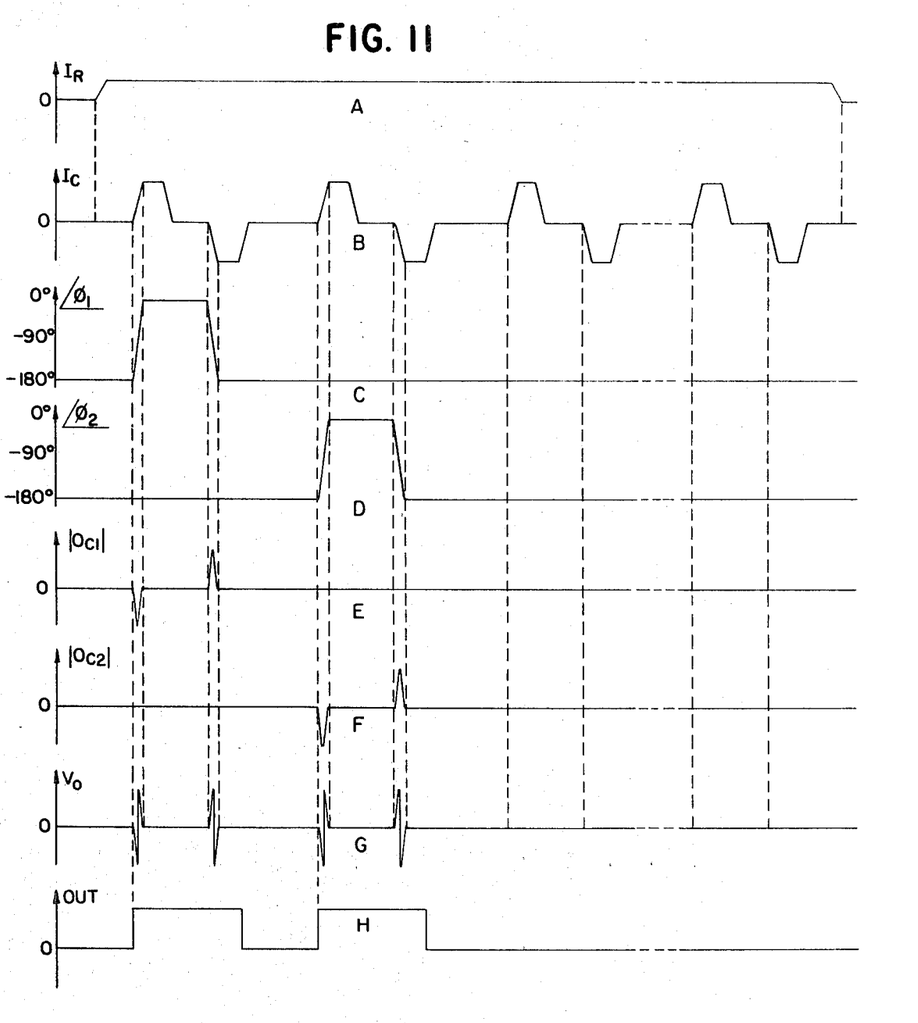
FIG. 11 shows a series of waveforms useful in understanding one mode of operating the circuit shown in FIG. 10.

Referring now to FIG. 11, a series of waveforms illustrating one manner of operating the system 110 is shown. As seen from FIG. 11A, the current $I_R$ flowing through the rod 14a (assuming that the transistor 52a has been rendered conductive) is a long-duration pulse. From FIG. 11B, it is seen that the current $I_c$ is a series of positive-going pulses followed by negative-going pulses, there being a positive-going pulse and a negative-going pulse for each one of the particular coils 44a–44m which are to be switched into the circuit by the transistors 102a–102m. The first positive and negative pulses of the waveforms shown in FIG. 11B occur during the time that the transistor 102a is made conductive by a signal appearing on the line 108a.

The magnitude of the current $I_R$ flowing through the rod 14a is insufficient to cause a direction change in the flux which is in the magnetic materials 30 of sections 20a and 20b of the rod 14a. Therefore, the direction of the flux in each of the materials 30 in sections 20a and 20b of the rod 14a will be the same as it was the last time the word defined by the rod 14a was read. It will be assumed that this direction will be to the left along the longitudinal axis of the rod 14a, or, in other words, in the −180° direction.

The transistor 102a is switched on before the first positive-going current pulse of current $I_c$, so this pulse is applied through the coil 44a. The direction of the flux $\angle \phi_1$ in the magnetic material 30 of section 20a in the rod 14a will thus be caused to switch from the −180° direction to the 0° direction, as seen in FIG. 11C. Because the coil and the rod are not precisely 90° with respect to one another, the direction which each line of flux takes in changing from −180° to 0° will be the same. Thus, for a short time during the switching period, there will be a primarily circumferential flux $|\phi_{c1}|$ in the material 30 of section 20a of the rod 14a, as seen in FIG. 11E. This short duration of circumferential flux $|\phi_{c1}|$ will cause a voltage equal to the derivative of the circumferential flux to be induced along the rod 14a and the common conductor 40 to the junction 122. Since the voltage at the junctions 122 and 124 were initially adjusted to be equal, this induced voltage on the rod 14a will cause an unbalance between the voltages at the junctions 122 and 124. Therefore, the amplifier 130 will provide a signal $V_o$ at its output, which is seen as the first signal in FIG. 11G. This pulse will set the flip-flop 126 to the 1 state, as seen by the first pulse in FIG. 11H, thereby indicating the presence of a 1 in section 20a of the rod 14a.

When the first negative-going pulse is applied to the coil 44a, the flux in the material 30 of section 20a of the rod 14a will again be caused to switch back to the −180° direction (FIG. 11C), thereby causing another voltage to be induced along the rod 14a and causing a second pulse to appear at the output of the amplifier 120, which is the second pulse on FIG. 11G. This second pulse, however, will have no effect on the output of the flip-flop 126, because it is already set to the 1 state. However, shortly thereafter, a reset pulse will be applied over the line 128 to the reset (R) input of the flip-flop 126 from the coil select logic circuitry 104 and thereby reset the flip-flop 126 to its 0 state, as seen in FIG. 11H. At that time, the flip-flop 126 is in a position to be able to accept the next bit of information which is to be read.

After the first negative pulse of current $I_c$ returns to zero volts, the transistor 102a is made nonconductive and the transistor 102b is made conductive, and identical events occur, since magnetic material 30 appears in section 20b of the rod 14a, and thus another 1 bit is read (see FIGS. 11B, 11F, the third and fourth pulses in FIG. 11G, and the second pulse in FIG. 11H). Thereafter the transistor 102b is made nonconductive, and the transistor 102c is made conductive.

Since there is no material 30 in section 20c of the rod 14a, there will be no flux direction change, and thus no voltage will be induced along the rod 14a and the common conductor 40. Therefore the voltages at the junctions 122 and 124 will remain constant, and no voltage pulse will be applied at the output of the amplifier 120, as seen by the absence of pulses after the fourth pulse in FIG. 11G. Thus, the flip-flop 126 will not be set to its 1 state, thereby indicating that a 0 bit is present at that particular section, as seen by no pulse after the second pulse in FIG. 11H. when the reset pulse is applied to the reset (R) input of the flip-flop 126, it will have no effect, since the flip-flop 126 is already reset. A similar action occurs in section 20m of the rod 14a, since no material 30 is there either.

Thus it is seen that, by using the system 110, it is possible that the bits of a selected word may be read out in a serial order. This is advantageous where one desires a low-cost system and can tolerate a system which operates slower than the previously described parallel-output systems.

Figure 12:
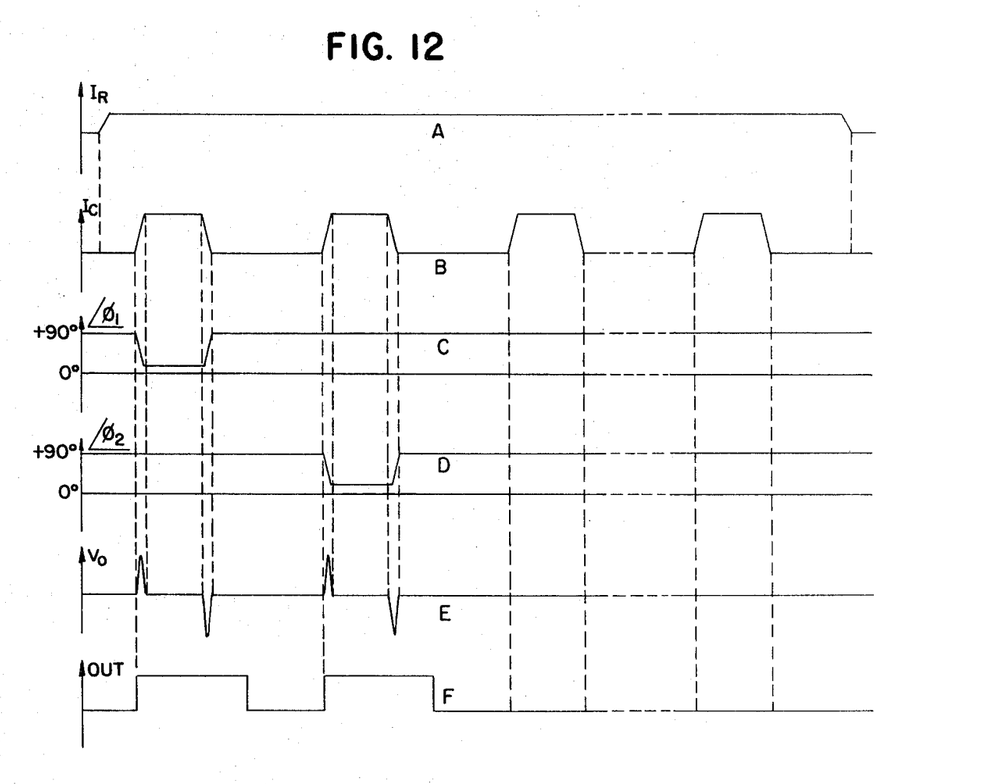
FIG. 12 shows a series of waveforms useful in understanding a second mode of operating the circuit shown in FIG. 10.

Referring now to FIG. 12, a manner of operating the system 110 will be described in which the reset pulses of current $I_c$ are no longer necessary; thus, when operating the system 110 in accordance with FIG. 12, the current $I_c$ will have only positive pulses, as seen in FIG. 12B. From FIG. 12A, it is seen that the current $I_R$ applied to the selected rod has the same configuration as it did in FIG. 11A; however, in this instance the current is of such a magnitude as to cause the flux in each of the materials 30 of the various sections along the selected rod to assume a +90° direction, or, in other words, have a direction circumferentially clockwise around the axis of the selected rod. The first $I_c$ pulse will occur when the transistor 102a is made conductive and will flow through the coil 44a. This pulse will cause the direction of the flux $\angle \phi_1$ in the material 30 located in section 20a of the rod 14a to switch from a +90° direction to a substantially longitudinal 0° direction, due to the fact that current in and the number of turns of the coil 44a are such that the longitudinal component of the flux $|\phi_2|$ will be much greater than the circumferential component of the flux $|\phi_c|$. When the direction of the flux $\angle \phi_1$ changes from the +90° direction to the substantially 0° direction, a voltage $V_o$ is induced along the rod 14a, which will be sensed by the amplifier 120 in the same manner as previously described. This sensed voltage $V_o$ will trigger the flip-flop 126 as previously explained. When the trailing edge of the current pulse through the coil a occurs, the flux will return to the +90° circumferential direction due to the continuing existence of the current $I_c$ flowing through the rod 14a, and this causes a second $V_o$ pulse, which is neglected by the flip-flop 126. Thereafter, a pulse appears on the line 128 and resets the flip-flop 126. FIG. 12C shows the direction of the flux $\angle\phi_1$ in the material 30 of section 20a of the rod 14a during this time, and FIG. 12E shows the output voltage $V_o$ of the amplifier 120.

Similar action occurs in the material 30 in section 20b of the rod 14a as seen in FIG. 12D, where $\angle\phi_2$ is shown. However, in section 20c of the rod 14a, no material 30 exists, so no flux can exist. Thus, when the current pulse is applied through the coil 44c, no flux direction change can occur, and thus the voltages at the junctions 122 and 124 will remain constant. In this case, the flip-flop 126 will not be set. Similar action occurs in section 20n of the rod 14a. FIG. 12F shows the output of the flip-flop 126, which, as can be seen, is the series of bits 110—0, which is the word defined by the rod 14a.

Another way of avoiding the reset pulse of FIG. 11B would be to have the current $I_R$ of FIG. 12A be a single pulse occurring after all of the current $I_c$ pulses are finished. This would reset the flux in the material 30 at this time. Otherwise, operation would be similar to that described with respect to FIG. 11.

Referring now to FIG. 13, there is shown a system 130, in which complementary pairs of rods are again used to define the particular bits which compose one word. In the system 130, each complementary pair of rods defines a single word. For example, the rods 14a and $\overline{14a}$ define the word 110—0. In the system 130, the common conductor 40 is connected to each of the rods 14a–14n, and a common conductor 132 is connected to each of the rods $\overline{14a}$–$\overline{14n}$. The conductors 40 and 132 are respectively connected to the junctions 122 and 124 through respective diodes 134 and 136. The diodes 134 and 136 are poled to conduct only positive currents; therefore, the voltage pulse due to the negative-going edge of the coil current pulse will not be applied to the junctions 122 and 124.

The output of the amplifier 120 is connected through a forward-poled diode 138 to the set (S) input of the flip-flop 126 and through a reverse-poled diode 140 to the reset (R) input of the flip-flop 126. a–14 a–14

Figure 14:
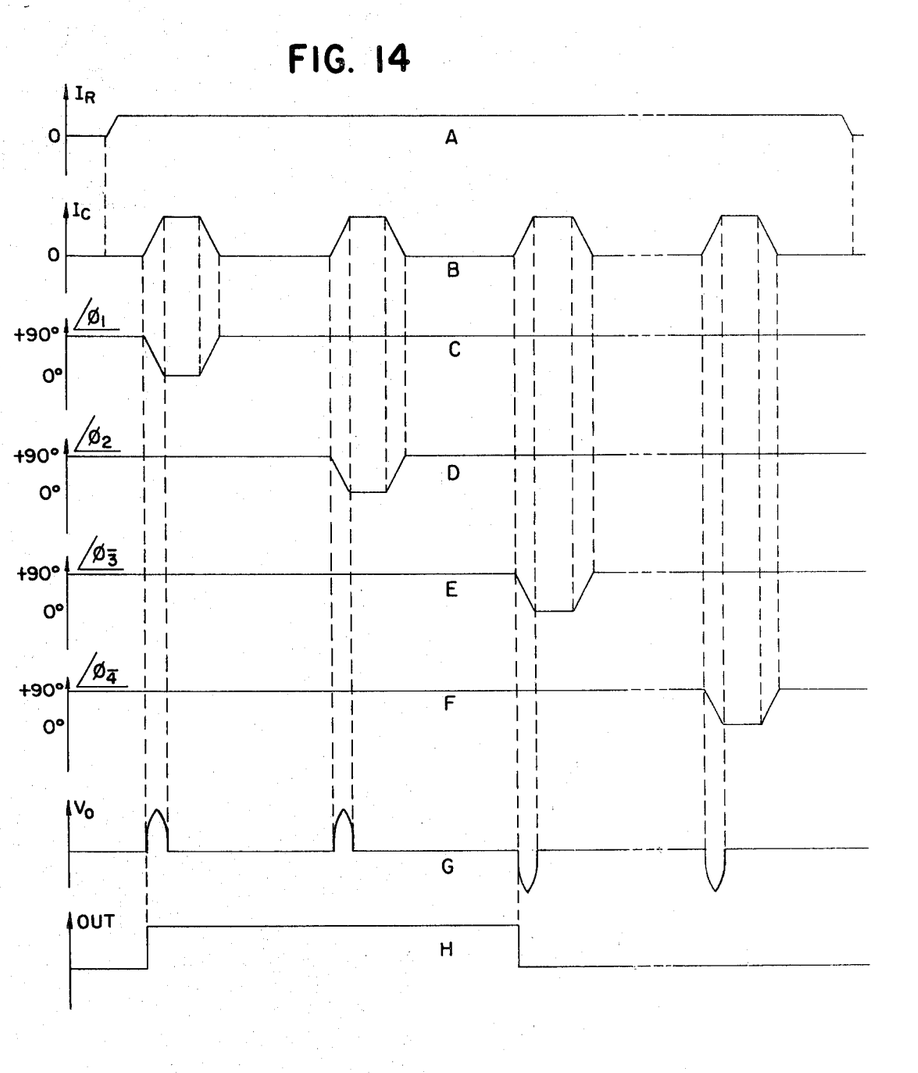
FIG. 14 shows a series of waveforms useful in understanding the operation of the circuit shown in FIG. 13.

Referring now to FIG. 14, there is shown a series of waveforms which illustrate one manner of operating the system 130. FIG. 14A shows the current $I_R$ through the rod 14a, assuming that the transistor 52a is made conductive. This current is of such a magnitude as to cause a circumferential flux component $|\phi_c|$ in the +90° direction to exist in each of the sections 30 of the rods 14a and $\overline{14a}$. When the first $I_c$ current pulse (FIG. 14B) is applied through the coil 44a due to the fact that the transistor 102a is made conductive, the direction of the flux $\angle\phi_1$ in the material 30 which is in section 20a of the rod 14a will be caused to change from the +90° direction to the 0° direction, as previously explained. See FIG. 14C. This flux direction change causes a voltage to be induced in the rod 14a, which is applied through the diode 134 to the junction 122, thereby disturbing the equality of the voltage at the junctions 122 and 124. Since the junction 122 is more positive than the junction 124, a positive voltage $V_o$ will be applied at the output of the amplifier 120, as seen by the first pulse in FIG. 14G. The voltage $V_o$ will flow through the diode 138 to set the flip-flop 126, which thereafter will provide a positive voltage at its output (FIG. 14H), indicating the presence of a 1 bit.

When the coil current is applied to the coil 44B, the direction of the flux $\angle\phi_2$ in the material 30 which is in section 20b of the rod 14a will again change (see FIG. 14D) and cause a second pulse voltage to be induced in the rod 14a and applied through the diode 134 to the junction 122, thereby causing a second positive pulse to appear at the output of the amplifier 120 (FIG. 14G). This second positive pulse is again applied to the set (S) input of the flip-flop 126, but, since it had previously been set, it will remain set, and no change will occur.

When the coil current is applied through the coil 44c, the direction of the flux $\angle\phi_3$ in the material 30 of section 20c of the rod $\overline{14a}$ will change directions (FIG. 14E), thereby inducing a voltage in the rod $\overline{14a}$. This voltage will be applied through the line 132 and the diode 136 to the junction 124. In this case, the junction 124 will be more positive than the junction 122, and therefore a negative voltage will appear at the output of the amplifier 120, as seen by the third pulse in FIG. 14G. This negative voltage will be applied through the diode 140 to the reset (R) input of the flip-flop 126 and reset it, so that its output voltage will be zero (FIG. 14H). This will indicate a 0 bit present in section 20c of the complementary pair of rods 14a and $\overline{14a}$. A similar action will occur in the material 30 in section 20m of the rod 14a, where the direction of the flux $\angle\phi_4$ changes (see FIG. 14F, FIG. 14G, and FIG. 14H). Referring to FIG. 14H, there is shown the output of the flip-flop 126, which is the digital word 110—0 as defined by the complementary pair of rods 14a and $\overline{14a}$.

The advantage of having a system such as the system 130 is that the 1 bits will be represented by a positive voltage at the output of the amplifier 120, and the 0 bits will be represented by a negative voltage at the output of the amplifier 120. This increases the signal-to-noise ratio, so there is less chance of falsely setting or resetting the output flip-flop 126.

What is claimed is:

1. A parallel output read only memory for providing a plurality of simultaneous signals indicative of a plurality of logical bits of one or another type which make up a predetermined digital word, said logical being permanently stored in said memory, said memory comprising:

a plurality of elongated electrically conducting nonmagnetic substrates each divided into a given number of corresponding longitudinally ordered sections, said substrates being aligned to provide a coordinately arranged row by column matrix in which the sections of a given substrate determines a given row and each group of corresponding sections of different substrates determine a given column, at least one certain one of said sections having a material capable of being magnetized affixed thereto, whereby the presence of said material indicates a bit of said one type and the absence of said material indicates a bit of said other type, said material having a flux of an initial direction existing therein, said predetermined word being the bits present in at least a portion of one of said rows or one of said columns;

a common conductor having one end coupled to a corresponding end of each of said substrates, said common conductor being positioned with respect to said substrates so that a current caused to flow through any one of said substrates in one direction will flow through said common conductor in substantially the opposite direction;

a plurality of windings, each of which surrounds all of said substrates and said common conductor, each of said windings being aligned with a different column of said matrix;

means for causing a current pulse to flow through one of a selected substrate or a selected winding, said current pulse being of such polarity that the flux initially existing in the material affixed to said certain section is caused to change directions in the event said certain section is in the row or column defined by said selected substrate or said selected winding;

means for sensing any flux directional change due to the application of said current, each of said sensing means being coupled to a different winding in the event said current pulse flows through said selected substrate and each of said sensing means being coupled to a different substrate in the event said current pulse flows through said selected winding; and means to cause said flux to revert back to its initial direction in the event said certain section is in the row or column defined by said selected substrate or said selected column.

2. The invention according to claim 1 wherein said plurality of substrates are divided into complementary pairs of substrates in such a manner that each pair of corresponding sections of each pair of substrates defines a logical bit by having only one of the corresponding sections of each pair of corresponding sections in each pair of substrates having a material capable of being magnetized affixed thereto, each logical bit being of said one type if said material is affixed to a section in a first one of said pair of substrates and each logical bit being of said other type if said material is affixed to a section of a second one of said substrates;

wherein the initial direction of the flux in said material affixed to those sections associated with a certain column is caused to be circumferential about the axis of the substrates in which each of said sections is included;

wherein said sensing means includes a two-input sensing amplifier, one of said inputs being coupled to said first substrate of said pair of substrates and the other of said inputs being coupled to said second substrate of said pair of substrates; and wherein said current pulse flows through a selected winding, said current pulse causing the direction of the flux in the material affixed to those sections aligned with said selected winding to change, said flux direction change causing a voltage of one polarity to be applied between the inputs of each one of said sensing amplifiers if said material is affixed to the first one of said pair of substrates in said selected column, and a voltage of opposite polarity to be applied between the inputs of each one of said sensing amplifiers if said material is affixed to the second one of said substrates in said selected column.

3. The invention according to claim 1 wherein said current pulse flows through said selected substrate, and each of said sensing means is coupled to a different winding; and wherein said certain section is one of the sections of said selected substrate and is associated with one of said rows of said matrix.

4. The invention according to claim 3 wherein the initial direction of said flux in said certain section is circumferentially around said certain section and said current pulse through said selected substrate causes said flux to change direction by 180°, said change of flux direction causing a voltage to be induced in the winding aligned with the row with which said certain section is associated, said voltage being sensed by a sense amplifier which is included in said sensing means and which is coupled to said winding to indicate a bit of said one type; and wherein said flux is caused to revert to its initial direction by the application to said selected substrate of a second current pulse of polarity opposite to said first-mentioned current pulse.

5. The invention according to claim 3 wherein said substrates are positioned in a magnetic field having a direction substantially parallel to said the longitudinal axis of said selected substrate, whereby the initial direction of said flux in said certain section is in the same direction as the longitudinal axis of the selected substrate;

wherein said current pulse through said selected substrate causes said flux to change to a direction circumferential around said certain section for the duration of said current pulse, said change of flux direction causing a voltage to be induced in the winding aligned with the row with which said certain section is associated, said voltage being sensed by a sense amplifier which is included in said sensing means and which is coupled to said winding to indicate a bit of said one type; and wherein said flux in said certain section reverts to its initial direction upon the termination of said current pulse due to the presence of said magnetic field.

6. A serial output read only memory for providing a plurality of successive signals indicative of a plurality of logical bits of one or another type which make up a predetermined digital word, said logical bits being permanently stored in said memory, said memory comprising:

a plurality of elongated electrical conducting nonmagnetic substrates each divided into a number of corresponding longitudinally ordered sections, said substrates being aligned to provide a coordinately arranged row by column matrix in which the sections of a given substrate determine a given row and each group at corresponding sections of different substrates determine a given column, at least one certain one of said sections of a selected substrate having a material capable of being magnetized affixed thereto, whereby the presence of said material indicates a bit of said one type and the absence of said material indicates a bit of said other type, said material of said certain section having a flux of an initial direction existing therein, said predetermined word including, at least in part, the logical bits determined by the presence or absence of said material from each section of at least a portion of said selected substrate;

a common conductor having one end coupled to corresponding ends of certain of said substrates, said common conductor being positioned with respect to said substrates so that a current caused to flow through any one of said substrates in one direction will flow through said common conductor in substantially the opposite direction;

a second conductor through which current flows;

a plurality of windings, each of which surrounds all of said substrates and said common conductor, each of said windings being aligned with a different column of said matrix;

means for providing a current at an output, said current flowing through said selected substrate and said common conductor and through said second conductor, the magnitude of the current flowing through said common conductor and said second conductor being such that equal voltages exist at the ends thereof which are remote from the end of said common conductor that is coupled to said certain substrates in the case of said common conductor and remote from said current means output in the case of said second conductor;

means for causing a current pulse to flow through each of a selected group of said windings, one at a time, in predetermined successive order, said current pulses being of such polarity that the flux which initially existed in the material affixed to said certain section is caused to change directions when a current pulse flows through the winding aligned with the column with which said certain section is associated, whereby a change in voltage is caused to exist in the one of said common conductor or said second conductor coupled to said selected substrate, said flux thereafter being caused to revert to its initial direction; and sensing means coupled to said common conductor and said second conductor for sensing said voltage change.

7. The invention according to claim 6 wherein said plurality of substrates are divided into complementary pairs of substrates in such a manner that each pair of corresponding sections of each pair of substrates defines a logical bit by having only one of the corresponding sections of each pair of corresponding sections in each pair of substrates having a material capable of being magnetized affixed thereto, each logical bit being of said one type if such material is affixed to a section in a first one of said pairs of substrates and each logical bit being of said other type if said material is affixed to a section of a second one of said substrates;

wherein said common conductor is coupled to each of said first one of said pairs of substrates and said second conductor is coupled to each of said second one of said pairs of substrates;

wherein said current flowing through said selected substrate also flows through the substrate complementary to said selected substrate, said current being of such a magnitude as to cause, in those sections which have said material affixed thereto and which are a part of either said selected substrate or said substrate complementary thereto, a flux to flow in a direction circumferential about the longitudinal axis of the substrates, said circumferential direction of said flux being said initial direction;

wherein, upon the occurrence of a current pulse being applied to a given winding, the direction of the flux in the material affixed to the specific section aligned with said given winding and in said selected substrate or the substrate complementary thereto changes towards the longitudinal axis of said substrate; and wherein, upon termination of said current pulse which is applied to said given winding, the direction of the flux in the material affixed to said specific section reverts to said initial direction due to the continuing application to said selected substrate, and the substrate complementary thereto, of said current.

8. The invention according to claim 6 wherein said common conductor is connected to each of said substrates and said second conductor is connected to a third conductor, said second and third conductors being within said windings, said third conductor being connected to said means for causing said current to flow through said second conductor in such a manner that current flows through said third conductor in a direction substantially the same direction as the current flowing through said selected substrate, and current flows through said second conductor in substantially the same direction as the current flowing through said common conductor.

9. The invention according to claim 8 wherein said current flowing through said selected substrate is of an insufficient magnitude to affect the direction of the flux in said material of said certain section;

wherein said initial flux direction in the material of said certain section is substantially parallel to the longitudinal axis of said selected substrate;

wherein said current pulse applied to said winding associated with said certain section causes said flux in said material affixed thereto to change direction by 180°; and wherein said flux in said material of said certain section is caused to revert to its initial direction by the application to said winding associated with said certain section of a current pulse of polarity opposite to said first applied current pulse.

10. The invention according to claim 8 wherein said current flowing through said selected substrate is of such a magnitude as to cause the flux in said material of said certain section to have a direction circumferential around the longitudinal axis of said substrate, said circumferential direction being said initial direction;

wherein the existence of said current pulse which is applied to said winding associated with said certain section causes the direction of the flux in said material affixed thereto to change towards the longitudinal axis of said substrate; and wherein, upon termination of said current pulse which is applied to said winding associated with said certain section, the direction of the flux in said material affixed to said certain section reverts to said initial direction due to the continuing application to said selected substrate of said current.

* * * * *